J. D. GROOVER.
ANTISLIPPING DEVICE.
APPLICATION FILED MAR. 27, 1922.
1,418,916.
Patented June 6, 1922.
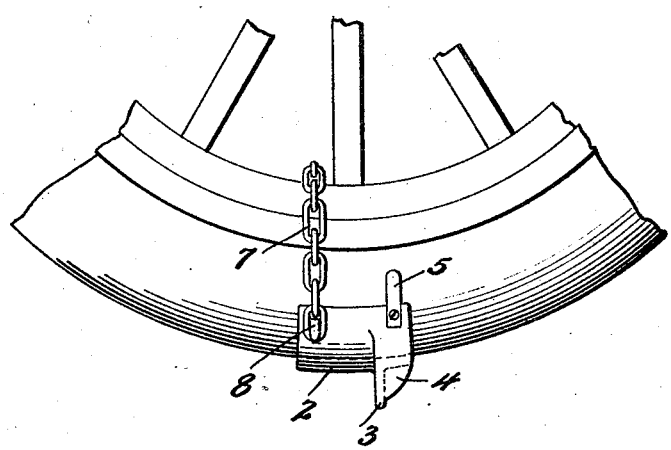
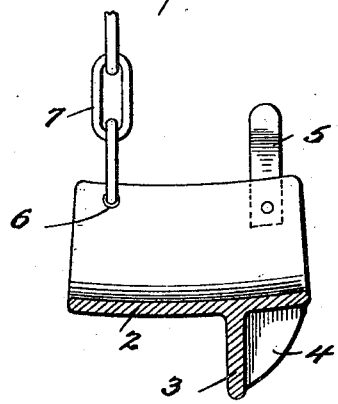
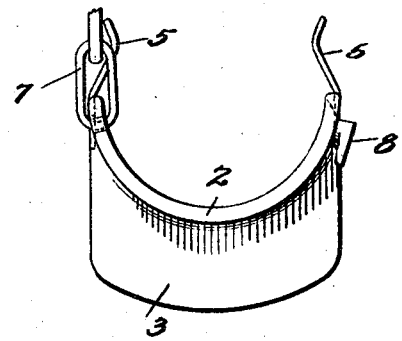
Inventor
John D. Groover
By Edward C. Sasnett
Attorney

UNITED STATES PATENT OFFICE.

JOHN D. GROOVER, OF ATLANTA, GEORGIA.

ANTISLIPPING DEVICE.

1,418,916.  Specification of Letters Patent.  Patented June 6, 1922.

Application filed March 27, 1922. Serial No. 547,156.

*To all whom it may concern:*

Be it known that JOHN D. GROOVER, citizen of the United States, residing at Atlanta, in the county of Fulton and State of Georgia, has invented certain new and useful Improvement in Antislipping Devices, of which the following is a specification, reference being had therein to the accompanying drawing.

The present invention relates to traction devices for motor vehicles, and more particularly to antislipping devices for motor vehicle wheels designed to produce sufficient tractive resistance for the wheels in soft or yielding road beds, for the purpose of preventing slipping or skidding of the wheels in such situations.

The general object of the invention is to provide an antislipping device for motor vehicle wheels which will effect ample resistance to the idle, or slipping rotation of the wheels in mud holes sandy road beds, and the like, and to produce a device of this character which is of simple and strong construction, which can be manufactured cheaply, and which can be readily put on and taken off a wheel without the use of tools. More particular objects and advantages of the invention will become apparent as this description proceeds.

Referring to the accompanying drawings for a description of one embodiment of the invention:—

Fig. 1 is a side view of a portion of a motor vehicle wheel having applied thereto a device constructed in accordance with this invention.

Fig. 2 is a longitudinal central section of the device.

Fig. 3 is a rear elevation of the device.

The antislipping device of my invention comprises a member 2, which is transversely curved to fit the periphery of a pneumatic tire. The member 2 has a radial projection 3, formed integrally therewith and extending transversely of member 2 throughout the width thereof, said projection being braced by lateral webs 4. Attached to the sides of member 2, adjacent one end, are resilient fingers 5, which are adapted to frictionally engage the sides of a tire. On one side of member 2, adjacent the other end, is an aperture 6, through which passes the terminal link of a chain 7, the other terminal link of said chain being adapted to engage over a hook lug 8 on the other side of said member.

Figure 1 shows the device in operative position on a tire. To apply the device one has merely to place it on the periphery of a tire, then pass the chain around the wheel rim and hook the terminal link thereof over lug 8. Thus the device can be very easily put on or taken off a tire without the use of a tool. The resilient fingers 5 will engage the sides of the tire with sufficient friction to prevent displacement of the device about axis 8—8, either by gravity or centrifugal force. The direction of travel of the vehicle, with respect to Fig. 1, is towards the right; and the device should be applied to the wheel as shown in that view, that is, in such position that the resistance applied to projection 3 in the slipping or skidding movement of the wheel will produce a movement tending to tilt the anchored end of the device about the other end thereof. Since chain 7 firmly anchors the device, it will be clear that projection 3 will be held substantially radial to the wheel, thus presenting a rigid abutment which will efficiently resist any idle, or slipping, rotation of the wheel in the soil of the road bed.

The device may be made of any suitable material, but I prefer to construct the body of aluminum and the resilient fingers 5 of steel. While I have described specifically one embodiment of my invention, I do not intend thereby to limit myself to the exact details shown, but what I claim as new and desire to secure by Letters Patent is:—

1. In combination with a motor vehicle wheel, an antislipping device comprising a body having a projection presenting a wide radial traction surface adjacent one end of said body, means for frictionally connecting said end with the sides of the wheel tire, and means for detachably connecting the other end of said body with the wheel rim.

2. An antislipping device for motor vehicle wheels, comprising a body having a concave under face adapted to fit the periphery of a pneumatic tire and having a projection on its outer face presenting a wide radial shoulder, means adjacent one end of the body for frictionally engaging the sides of the tire, and means for detachably connecting the other end of said body to the wheel rim.

3. An antislipping device for motor vehicle wheels, comprising a body transversely and longitudinally curved to fit the periphery of a pneumatic tire and having adjacent one end thereof a projection presenting a wide radial traction surface, means adjacent one end of said body for frictionally connecting the same with the sides of the tire, and a flexible member connected with the other end of said body adapted to pass around the wheel rim.

4. An antislipping device for motor vehicle wheels, comprising a body having a concave under face adapted to fit the periphery of a tire and having a radial projection on its outer face presenting a wide traction surface, fingers attached to the sides of said body adjacent one end thereof adapted to frictionally engage the sides of the tire, and detachable means for connecting the other end of said body to the wheel rim.

5. An antislipping device for motor vehicles, comprising a semicylindrical body adapted to fit the periphery of a pneumatic tire and having a radial projection on its outer face presenting a wide traction surface adjacent one end of the body, spring fingers attached to the sides of said body adjacent said end adapted to frictionally engage the sides of the tire, a chain attached at one end to one side of said body adjacent the other end thereof, and a hook formed on the other side of said body adjacent said other end adapted to detachably engage the free end of said chain.

In testimony whereof I hereunto affix my signature.

JOHN D. GROOVER.